United States Patent [19]

Ohya et al.

[11] 4,302,558

[45] Nov. 24, 1981

[54] ANTISTATIC RESIN COMPOSITION

[75] Inventors: Masaki Ohya; Akio Kobayashi; Takeo Ogiwara; Yoshikatsu Satake, all of Iwaki, Japan

[73] Assignee: Kureha Kagaku Kogyo Kabushiki Kaisha, Tokyo, Japan

[21] Appl. No.: 72,846

[22] Filed: Sep. 6, 1979

[30] Foreign Application Priority Data

Sep. 6, 1978 [JP] Japan .............................. 53-109284

[51] Int. Cl.$^3$ .................. C08F 265/06; C08F 297/02
[52] U.S. Cl. ................................ 525/218; 525/201; 525/212; 525/223; 525/274; 525/291; 525/296; 525/303
[58] Field of Search ............... 525/303, 201, 212, 218, 525/274, 291, 296, 223

[56] References Cited

U.S. PATENT DOCUMENTS 3,074,905 1/1963 Douglas .............................. 525/303
3,962,187 6/1976 Kline .................................. 525/303

FOREIGN PATENT DOCUMENTS 2309590  9/1975 Fed. Rep. of Germany ...... 525/303
45-33426 10/1970 Japan .................................. 525/303
47-9742  3/1972 Japan .................................. 525/303
48-18521 3/1973 Japan .
50-78642 6/1975 Japan .
51-29526 3/1976 Japan .

Primary Examiner—William F. Hamrock
Attorney, Agent, or Firm—Wenderoth, Lind & Ponack

[57] ABSTRACT

A graft copolymer is obtained by graft-polymerizing a vinyl or vinylidene monomer onto a rubber trunk polymer which comprises a polyalkylene oxide monomer comprising 4 to 500 alkylene oxide groups together with an ethylenic unsaturation, and a conjugated diene and/or an alkyl acrylate. This graft copolymer alone or in a mixture thereof with another thermoplastic resin, because of the presence of the polyalkylene oxide monomer unit incorporated in the rubber trunk polymer, provides a resin composition possessing excellent antistatic property, which, practically, is not lowered by washing.

2 Claims, No Drawings

ANTISTATIC RESIN COMPOSITION

BACKGROUND OF THE INVENTION

The present invention relates to a resin composition comprising a graft copolymer alone or a mixture of the graft copolymer and a thermoplastic resin compatible therewith, the graft copolymer having been obtained by graft-polymerizing a vinyl or vinylidene monomer onto a rubber trunk polymer with low electrical resistance comprising 1 to 50% (by weight, as in all percentages and parts set forth hereinafter) of a monomer comprising 4 to 500 alkylene oxide groups and a conjugated diene and/or an alkyl acrylate, which graft copolymer possesses an antistatic property that is not practically lowered by washing.

In general, plastics have high electrical resistance and tend to be easily charged with static electricity due to friction or peeling. For this reason, plastics are liable to attract dust and dirt, resulting in various troubles such as impairment of the appearances of shaped articles, sheets, films and fibers formed from these plastics.

Method for imparting antistatic property to such plastics that are susceptible to static electricity have been investigated and can be roughly classified as follows.

1. Methods which involve kneading an antistatic agent into the plastics.
2. Methods which involve applying an antistatic agent (surfactant) over the surface of the plastics.
3. Methods which involve applying a silicone compound over the surface of plastics.
4. Methods which involve chemically reforming the molecular structure of plastics.

Of these methods, a method which involves kneading an antistatic agent into plastics cannot successfully impart a permanent antistatic effect, and, when the antistatic agent present over the surface of the plastics is removed by washing with water or rubbing, the antistatic effect is lost.

As an exception, an antistatic agent of kneading-in type possessing an antiwashing property suitable for use in polyethylene, polypropylene and polyvinyl chloride has been reduced to practice. However, this antistatic agent is accompanied by certain problems. One is that a considerable time is required until its antistatic effect is restored after washing. Another is that, if an antistatic agent bleeds excessively over the surface of plastics, dust and dirt adhere thereonto. Still another problem is that a satisfactory antistatic agent has not yet been obtained for transparent and hard plastics on a commercial basis. Furthermore, this method requires a step of kneading-in an antistatic agent.

If the method which involves applying an antistatic agent over the surface of plastics is employed, its antistatic effect is drastically impaired upon washing.

The method which involves applying a silicone compound over the surface of plastics provides an excellent and substantially permanent antistatic effect but is disadvantageous from the standpoint of process efficiency and economy.

The method which involves chemically reforming the molecular structure of plastics by introducing hydrophilic groups into plastics by polymerization and the like generally requires the introduction of a considerable quantity of hydrophilic groups in order to obtain a high antistatic effect, so that the mechanical and other properties of the plastics deteriorate because of the increased hygroscopicity thereof.

SUMMARY OF THE INVENTION

As a result of our intensive investigation on processes for producing resins possessing permanent antistatic property that is not lowered by washing, we have obtained a rubber trunk polymer having a low specific volume resistivity. Further, we have found that a graft copolymer alone obtained by graft-polymerizing a vinyl or vinylidene monomer onto this rubber trunk polymer, or a mixture of the graft copolymer thus obtained and a resin compatible therewith possesses a permanent antistatic effect, and that a copolymer comprising 1 to 50% of a monomer comprising 4 to 500 alkylene oxide groups and 50 to 99% of a conjugated diene and/or an alkyl acrylate is suitable as the rubber trunk polymer. On the basis of these findings, we have arrived at the present invention.

More specifically, the antistatic resin composition according to the present invention comprises (A) 10 to 100 parts of a graft copolymer obtained by graft-polymerizing 20 to 95% of at least one vinyl or vinylidene monomer onto 5 to 80% of a rubber trunk polymer which in turn is a copolymer of 50 to 99% of a member selected from the group consisting of conjugated dienes, alkyl acrylates and mixtures thereof, 1 to 50% of a polyalkylene oxide monomer which is a monomer comprising 4 to 500 alkylene oxide groups together with an ethylenic unsaturation, and 0 to 49% of a vinyl or vinylidene monomer copolymerizable with the conjugated diene or alkyl acrylate; and (B) 0 to 90 parts of a thermoplastic resin compatible with the graft copolymer (A), the rubber trunk polymer being 5 to 80% of the total of the graft copolymer (A) and the thermoplastic resin (B).

While the antistatic property of the resin composition according to the present invention can, of course, be improved by adding an antistatic agent, no antistatic agent, practically, needs to be added. Since the polyalkylene oxide groups are chemically bonded to the rubber trunk polymer, the antistatic property of the resin composition will not be lowered even under severe washing conditions.

Further, since the matrix resin need not be modified to be hydrophilic, the overall properties of the composition will not appreciably be affected even if the rubber phase absorbs moisture. By suitably controlling the particle size, quantity and refractive index of the rubber trunk polymer, a transparent resin composition possessing improved impact strength can be obtained.

Processes for preparing resin compositions possessing an antistatic property by copolymerizing monomers comprising polyalkylene oxide groups are disclosed, for example, in Japanese Patent Laid-Open Publications No. 18521/1973, No. 29526/1976 and No. 78642/1975. However, all of the resins obtained by these processes are random copolymers of monomers comprising polyalkylene oxide groups or mixtures thereof with other polymers. If the monomers comprising polyalkylene oxide groups are used in small quantity, an excellent antistatic property cannot be obtained, while these monomers in large quantity increase the hygroscopicity of the resin composition.

In contrast, it is essential in the present invention that the monomer comprising polyalkylene oxide groups be present as a constituent of the rubber trunk polymer. The resin composition of this invention exhibits an excellent antistatic effect presumably because the rubber trunk polymer is dispersed in branch polymers or in the matrix resin composed of a thermoplastic resin compatible with the graft copolymer and branch polymers in mutually bridged state in a shaped resin article, and the electric charge is diffused mainly through the rubber trunk polymer phase and thus is reduced. In the resin composition of this invention, the hygroscopicity of the branch polymer phase undergoes substantially no change even if the hygroscopicity of the rubber trunk polymer phase increases, and hence the mechanical strength or heat resistance of the composition is not appreciably reduced.

As has been set forth hereinabove, the monomer comprising alkylene oxide groups must be present in the rubber trunk polymer. In the case where this monomer is present, not as a constituent of the rubber trunk polymer, but as a constituent of a random copolymer, a polymer possessing excellent antistatic property cannot be obtained as in the present invention with the same quantity of the monomer.

DETAILED DESCRIPTION OF THE INVENTION

The rubber trunk polymer of the present invention is a rubbery copolymer of 50 to 99% of a conjugated diene and/or an alkyl acrylate, 1 to 50% of a monomer comprising 4 to 500 alkylene oxide groups together with an ethylenic unsaturation (hereinafter referred to as a polyalkylene oxide monomer), and optionally 0 to 49% of one or more vinyl or vinylidene monomers copolymerizable with the conjugated diene or alkyl acrylate.

This rubber trunk polymer predominantly comprises a conjugated diene and/or an alkyl acrylate.

For the conjugated dienes, 1,3-butadiene, isoprene, chloroprene, and 1,3-pentadiene are used.

For the alkyl acrylates, ethyl acrylate, propyl acrylate, butyl acrylate, hexyl acrylate, octyl acrylate, and nonyl acrylate are used.

The sum of the quantities of the conjugated diene and alkyl acrylate amounts to 50 to 99% of the rubber trunk polymer. If this sum is less than 50%, the rubber trunk polymer cannot have a sufficiently low glass transition temperature, resulting in a poorer antistatic effect.

Conversely, in the case where this sum is greater than 99%, the quantity of the polyalkylene oxide monomer to be added will necessarily be reduced, and thus the desired antistatic effect cannot be obtained.

The polyalkylene oxide monomer comprises, in addition to an ethylenic unsaturation, a polyalkylene oxide chain or block represented by the formula:

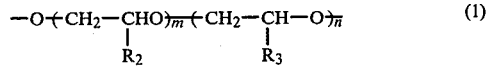  (1)

wherein each of $R_2$ and $R_3$, which may be the same or different, is hydrogen or an alkyl group having 1 to 4 carbon atoms, and m and n are integers that meet the requirement $4 \leq m+n \leq 500$. Preferably, a polyalkylene oxide monomer in which at least one of $R_2$ and $R_3$ is hydrogen and which comprises a polyethylene oxide block consisting of 4 or more ethylene oxide groups is used.

A preferred polyalkylene oxide monomer is one or more monomers represented either by the following formula (2):

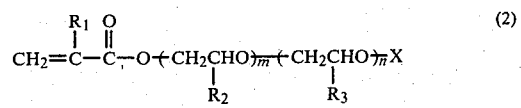

wherein: $R_1$ is hydrogen or an alkyl group having 1 to 4 carbon atoms; X is hydrogen, an alkyl group having 1 to 9 carbon atoms,

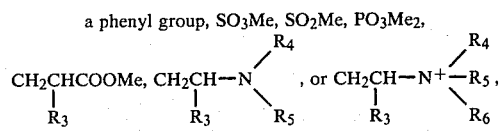

each of $R_4$, $R_5$ d $R_6$ being hydrogen or an alkyl group having 1 to 9 carbon atoms, and Me being hydrogen, Na, Li or K; and $R_2$, $R_3$, m, and n have the same meaning as in the formula (1), or by the formula (3):

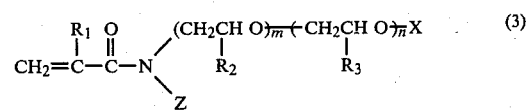

wherein Z is hydrogen, an alkyl group having 1 to 40 carbon atoms, a cycloalkyl group having 3 to 6 carbon atoms,

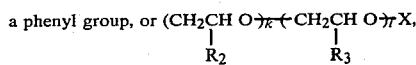

k and l being integers that meet the requirement $4 \leq k+l \leq 500$; and $R_1$ to $R_6$, X, Me, m, and n are as defined above.

Among the monomers represented by the formula (2) or (3), those in which at least one of $R_2$ and $R_3$ is hydrogen and which comprises a polyethylene oxide block consisting of 4 or more ethylene oxide groups are particularly preferable as mentioned earlier.

It is of course possible, however, to use analogous monomers other than the monomers represented by the formula (2) or (3), which comprise an ethylenic unsaturation and further can lower the volume resistivity of the rubber trunk polymer.

The polyalkylene oxide monomer comprises 4 to 500, preferably 6 to 50, and more preferably 9 to 50, alkylene oxide groups. In the case where the quantity of the alkylene oxide groups is less than 4, it is difficult to obtain an antistatic property. A polyalkylene oxide monomer comprising more than 500 alkylene oxide groups, when subjected to polymerization, is not easily soluble in water or other monomers, resulting in poor polymerizability.

Further, if the quantity of the monomer comprising polyalkylene oxide groups is less than 1% of the rubber trunk polymer, sufficient antistatic property cannot be obtained. Conversely, more than 50% of this monomer results in some difficulty in the polymerization required for the formation of the rubber trunk polymer or the graft copolymer as well as in post-treatments of the polymer obtained such as precipitation with an acid or salting out.

For vinyl or vinylidene monomers copolymerizable with the conjugated diene or alkyl acrylate which are optionally used in the preparation of the rubber trunk polymer, known monomers can be utilized.

For example, one or more monomers selected from alkyl methacrylates, acrylic acid, methacrylic acid, acrylamide, methacrylamide, vinyl acetate, unsaturated nitriles, aromatic vinyl monomers, alkyl vinyl ethers, alkyl vinyl ketones, 2-hydroxyethyl (meth)acrylate, diacetone acrylamide, vinyl chloride, vinylidene chloride, itaconic acid, alkyl itaconates, isobutene, 2-acid phosphoxyethyl methacrylate, 3-chloro-2-acid phosphoxypropyl methacrylate, and sodium styrenesulfonate can be used.

An improved antistatic property can be obtained by selecting as the above enumerated vinyl or vinylidene monomers copolymerizable with the conjugated diene or alkyl acrylate highly polar monomers such as acrylonitrile or monomers having an anionic substituent such as a sulfonate group, phosphate group or carboxylate group.

These vinyl or vinylidene monomers are used in a quantity of 49% or less of the monomer mixture which provides the rubber trunk polymer. If this quantity is larger than 49%, the glass transition temperature becomes higher and the rubbery property of the trunk polymer is lost.

The rubber trunk polymer can optionally comprise as a crosslinking agent a polyfunctional monomer having two or more of at least one species of ethylenically unsaturated groups, such as vinyl group, 1,3-butadienyl group, acryloxy group, methacryloxy group, and allyl group, in a quantity of 0 to 10% of the rubber trunk polymer. A polyfunctional monomer further comprising 4 to 500, preferably 9 to 50, polyalkylene glycol groups is particularly preferred because such a monomer acts as a crosslinking agent and simultaneously serves as an antistatic property modifier.

By graft-polymerizing a vinyl or vinylidene monomer onto the rubber trunk polymer thus obtained, the graft copolymer of the present invention possessing excellent antistatic property can be obtained.

For the vinyl or vinylidene monomers to be used in the graft polymerization, known monomers can be employed. For example, one or more monomers selected from alkyl acrylates, alkyl methacrylates, acrylic acid, methacrylic acid, acrylamide, methacrylamide, vinyl acetate, unsaturated nitriles, aromatic vinyl monomers, conjugated dienes, alkyl vinyl ethers, alkyl vinyl ketones, 2-hydroxyethyl (meth)acrylate, (alkoxy)-polyethylene glycol (meth)acrylate, diacetone acrylamide, vinyl chloride, vinylidene chloride, itaconic acid, alkyl itaconates, and isobutene can be used.

The proportion of the rubber trunk polymer in the graft copolymer ranges from 5 to 80%, preferably from 8 to 70%, the proportion of the branch polymer ranging from 20 to 95%, preferably from 30 to 92%. If the proportion of the rubber trunk polymer is lower than 5%, it will be difficult to obtain antistatic property. On the other hand, the rubber trunk polymer in higher proportions results in loss of the rigidity of the graft copolymer as well as in poor processability.

The composition of the graft copolymer as herein referred to and that of the rubber trunk polymer mentioned earlier are determined on the basis of the starting monomers. However, since the degree of polymerization in the respective stages is 90% or higher, the resin composition of the present invention has substantially the same composition as that of the monomers.

While the graft copolymer of this invention endowed with improved antistatic property can be prepared by an ordinary graft polymerization process using emulsion polymerization in the presence of a radical initiator, suspension polymerization or bulk polymerization, emulsion polymerization is most suitable for effectively controlling the particle size or dispersion of the rubber trunk polymer.

The monomer for the branch polymer may be polymerized either at one time or, in the case where the polymerization entails intense heat or monomers having different reactivities are used together, may be added and polymerized intermittently or continuously in accordance with a conventional process to prepare the desired graft copolymer.

The antistatic resin composition of the present invention can be a graft copolymer alone which comprises a rubber trunk polymer comprising polyalkylene oxide groups obtained as described above. A resin composition possessing excellent antistatic property can also be obtained by blending with 10 to 100 parts of the graft copolymer 0 to 90 parts of a thermoplastic resin compatible therewith. In this case, however, it is essential that the ratio of the rubber trunk polymer to the total of the graft copolymer and the thermoplastic resin be 5 to 80%, preferably 8 to 60%. A percentage of less than 5% of the rubber trunk polymer cannot readily produce antistatic property, while that in excess of 80% results in low heat resistance and poor processability.

Examples of thermoplastic resins to be used in combination with the graft copolymer are polyethylene, polypropylene, polyvinyl chloride, polyvinylidene chloride, aromatic vinyl polymers, nitrile resins, polymethyl methacrylate and the copolymers thereof, acrylonitrile-styrene-butadiene resins, acrylonitrile-styrene resins, polycarbonates, polyamide resins, polyester resins, and fluoro-resins. Needless to say, any other thermoplastic resins that are compatible with the graft copolymer can be used.

In accordance with the present invention, transparent resin products can easily be obtained by controlling the refractive indices of the rubber trunk polymer and branch polymer, although the products of the present invention are not limited to transparent products.

The resin composition of the present invention possessing excellent antistatic property can be formed or molded by an ordinary process, for example, injection molding, extrusion molding, compression molding, or vacuum forming. Accordingly, this resin composition can be formed into plastic moldings, sheets, films, tubes, and fibers.

The resin composition of the present invention is suitable for use, for instance, in electrical appliances or accessaries thereof (e.g., cassette tape recorder cases, front covers of picture tubes, record player covers, dust collectors and hoses of vaccum cleaners, covers of instruments, IC element casings, and various cases); packaging materials (e.g., doll cases, cans, bottles, and packaging films); acoustic materials (e.g., audio discs, video discs, and tapes for tape recorders); building materials (e.g., wall materials, flooring materials, panels, and window materials); lighting equipment (e.g., lamp shades, and displays); and plastics in general wherein an antistatic property is required.

In order to indicate more fully the nature and utility of this invention, the following specific examples of practice constituting preferred embodiments of the invention and comparison examples are set forth, it being understood that these examples are presented as illustrative only and not intended to limit the scope of the invention.

Test specimens were measured 7 days after forming upon adjusting their moisture content and 7 days after washing with water as described in Example 1. The data obtained show that the resin products according to the present invention have satisfactory antistatic property immediately after forming or washing with water. Thus, the antistatic property achieved by the present invention is not due to bleeding of the antistatic agent over the surface of the resin product with the elapse of time nor due to the moisture absorbed after forming or washing with water.

The test specimens used in Examples were prepared by pressing the resultant resin powder under heat. However, substantially the same results can be obtained with specimens prepared by pressing after kneading the powder with heated rolls or by extrusion molding through an extruder.

EXAMPLE 1

An aqueous dispersion composed of the following ingredients was adjusted to a pH of 7 with an aqueous solution of sodium hydroxide and charged into a 10-l stainless steel autoclave provided with agitating blades.

|   |   | Part |
|---|---|---|
| (a) | 1,3-butadiene | 6 |
|   | methyl acrylate | 3 |
|   | methoxypolyethylene glycol methacrylate | 1 |
|   | (having an average of ca.23 ethylene oxide groups) |   |
|   | tertiary dodecylmercaptan | 0.05 |
|   | diisopropylbenzene hydroperoxide | 0.02 |
|   | formaldehyde sodium sulfoxylate | 0.01 |
|   | ferrous sulfate heptahydrate | 0.0004 |
|   | disodium ethylenediaminetetraacetate | 0.0006 |
|   | sodium pyrophosphate | 0.05 |
|   | sodium dodecylbenzenesulfonate | 0.1 |
|   | deionized water | 30 |

The atmosphere within the autoclave was thoroughly purged with nitrogen, and the reaction mixture was agitated at 40° C. for 20 hours, whereupon a rubber latex of an average particle size of 0.08μ was obtained in a yield of 99%.

To 40 parts (10 parts as a rubber trunk polymer) of this rubber latex were added the following ingredients.

|   |   | Part |
|---|---|---|
| (b) | acrylonitrile | 54 |
|   | methyl acrylate | 36 |
|   | normal dodecylmercaptan | 3.6 |
|   | potassium persulfate | 0.072 |
|   | sodium hydrogensulfite | 0.018 |
|   | sodium dodecylbenzenesulfonate | 0.9 |
|   | deionized water | 270 |

The atmosphere within the autoclave was purged with nitrogen, and the reaction mixture was subjected to graft copolymerization at 50° C. for 20 hours under agitation. The resulting latex was withdrawn from the autoclave, and then subjected to deposition with an aqueous aluminum sulfate solution, adjusted to a pH of 7 with an aqueous sodium pyrophosphate solution, dehydrated, washed, and dried at 55° C. for 24 hours. As a result, a white powder was obtained in a yield of 97%.

This powder was pressed at 200° C. and 200 kg/cm² for 5 min. to prepare test specimens of 0.6 to 0.8 mm thickness. These test specimens were stored under normal conditions of 23° C. and 50% RH for a week, and thereafter the half-life of the charged voltage was measured by means of a Static Honest Meter (mfd. by Shishido Shokai, Japan) to evaluate the antistatic property thereof. The results obtained are shown in Table 1.

The measurement conditions were as follows.

| Applied voltage: | 8,000 V |
|---|---|
| Rotational speed: | 1,300 rpm. |
| Humidity: | 50–55% RH |
| Temperature: | 23° C. |
| Time period: | 1 min. |

In order to evaluate the antiwashing property, the surface of each test specimen was thoroughly washed with an aqueous solution of a commercially available detergent (mfd. by Lion Yushi K.K., Japan, under the trade name "Mama Lemon") and then thoroughly washed with distilled water. The specimens were stored under the conditions of 50% RH and 23° C. for a week to adjust their moisture content, whereafter the half-life of the charged voltage was measured by means of the Static Honest Meter. The results are set forth in Table 1.

EXAMPLE 2

Test specimens were prepared substantially in the manner set forth in Example 1 except that 81 parts of methyl methacrylate and 9 parts of methyl acrylate were used in place of the acrylonitrile and methyl acrylate, and the half-life of the charged voltage was measured by means of the Static Honest Meter. The results obtained are shown in Table 1.

EXAMPLES 3, 4 and 5

Graft copolymers having the compositions shown in Table 2 were prepared by the procedure of Example 1 from rubber trunk polymers and branch polymers each having the same composition as that of Example 2.

The results obtained in the same manner as in Example 1 are summarized in Table 2.

TABLE 1

|   | Half-life of charged voltage (sec.) | |
|---|---|---|
|   | Untreated | Washed with water |
| Example 1 | 10 | 6 |
| Example 2 | 27 | 21 |

TABLE 2

| | Rubber trunk polymer (part by wt.) | Branch polymer (part by wt.) | Half-life of charged voltage (sec.) | |
|---|---|---|---|---|
| | | | Untreated | Washed with water |
| Example 2 | 10 | 90 | 27 | 21 |
| Example 3 | 20 | 80 | 10 | 9 |
| Example 4 | 50 | 50 | 2 | 2 |
| Example 5 | 70 | 30 | <1 | <1 |

EXAMPLES 6 THROUGH 18

Test specimens were prepared substantially in the manner described in Example 1 except that the monomer composition was modified as shown in Table 3.

The results of the measurement by means of the Static Honest Meter are set forth in Table 3.

TABLE 3

| Example | Rubber trunk polymer (wt.%) | | | | | Branch polymer (wt.%) | | | | Half-life of charged voltage (sec.) | |
|---|---|---|---|---|---|---|---|---|---|---|---|
| | | | | | | | | | | Untreated | Washed with water |
| 6 | But 12 | MA 6 | M1 2 | TDM 0.1 | | MMA 80 | NDM 2.4 | | | 25 | 18 |
| 7 | But 12 | MA 6 | M1 2 | TDM 0.1 | | St 80 | NDM 1.0 | | | 23 | 21 |
| 8 | But 6 | MA 3 | M1 1 | TDM 0.05 | | St 67.5 | AN 22.5 | NDM 2.7 | | 12 | 3 |
| 9 | But 6 | MA 3 | M1 1 | TDM 0.05 | | MMA 81 | MA 8 | M1 1 | NDM 2.7 | 18 | 15 |
| 10 | But 13 | St 5 | M1 2 | | | MMA 48 | St 32 | NDM 1.5 | | 21 | 19 |
| 11 | But 6 | AN 2 | M1 2 | | | AN 67 | St 23 | NDM 2.4 | | 8 | 7 |
| 12 | But 6 | M1 4 | | | | MMA 72 | MA 18 | NDM 1.8 | | 6 | 5 |
| 13 | But 12 | MA 6 | M2 2 | DVB 0.2 | | AN 48 | MA 32 | NDM 3.2 | | 30 | 25 |
| 14 | But 12 | MA 5 | M3 2 | C1 1 | | AN 48 | MA 32 | NDM 3.2 | | 4 | 3 |
| 15 | But 12 | MA 5 | M4 3 | | | MMA 64 | MA 16 | NDM 1.6 | | 7 | 6 |
| 16 | But 12 | MA 6 | M5 2 | | | MMA 64 | MA 16 | NDM 1.6 | | 13 | 11 |
| 17 | But 12 | MA 4 | AN 2 | M1 2 | DVB 0.3 | MMA 80 | NDM 0.8 | | | 3 | 3 |
| 18 | BA 16 | AN 2 | M1 2 | DVB 0.3 | | MMA 80 | NDM 0.8 | | | 4 | 4 |

The symbols used in Table 3 and all succeeding tables denote the following.

| | |
|---|---|
| But | 1,3-butadiene |
| MA | methyl acrylate |
| MMA | methyl methacrylate |
| St | styrene |
| AN | acrylonitrile |
| BA | butyl acrylate |
| M1 | methoxypolyethylene glycol methacrylate (having an average of 23 ethylene oxide groups) |
| M2 | methoxypolyethylene glycol methacrylate (having an average of 9 ethylene oxide groups) |
| M3 | methoxypolyethylene glycol methacrylate (having an average of 40 ethylene oxide groups) |
| M4 | methoxypolyethylene glycol acrylate (having an average of 23 ethylene oxide groups) |
| M5 | polyethylene glycol acrylamide (having an average of 23 ethylene oxide groups) |
| TDM | tertiary dodecylmercaptan |
| NDM | normal dodecylmercaptan |
| DVB | divinylbenzene |
| C1 | polyethylene glycol dimethacrylate (having an average of 23 ethylene oxide groups) |

COMPARISON EXAMPLES 1 THROUGH 7

Test specimens were prepared substantially in the manner described in Example 1 except that the monomer composition was modified as shown in Table 4.

The results of the measurement by means of the Static Honest Meter are set forth in Table 4.

TABLE 4

| Comparison Example | Rubber trunk polymer (wt.%) | | | Branch polymer (wt.%) | | | Half-life of charged voltage (sec.) | |
|---|---|---|---|---|---|---|---|---|
| | | | | | | | Untreated | Washed with water |
| 1 | But 6 | MA 4 | TDM 0.05 | MMA 72 | MA 18 | NDM 1.8 | >3600 | >3600 |
| 2 | But 6 | MA 4 | TDM 0.05 | AN 54 | MA 36 | NDM 3.6 | 510 | 550 |
| 3 | MMA 78.5 | MA 19.5 | M1 2 | NDM 0.1 | | | >3600 | >3600 |
| 4 | St 98 | M1 2 | | NDM 0.1 | | | >3600 | >3600 |
| 5 | MMA 100 | | | NDM 0.1 | | | >3600 | >3600 |
| 6 | St | | | NDM | | | | |

TABLE 4-continued

| | Monomer composition (wt.%) | | | | | | Half-life of charged voltage (sec.) | |
|---|---|---|---|---|---|---|---|---|
| | Rubber trunk polymer | | | Branch polymer | | | Untreated | Washed with water |
| 7 | 100 But | 0.1 MMA | MA | NDM | | | >3600 | >3600 |
| | 6 | 72 | 22 | 0.1 | | | >3600 | >3600 |

EXAMPLE 19

Graft polymerization was carried out by continuously adding over a period of about 5 hours 80 parts of methyl methacrylate containing 0.8 part of normal dodecylmercaptan as a molecular weight regulator to 80 parts (20 parts as a rubber trunk polymer) of the same rubber latex as was used in Example 17.

The graft copolymer obtained was subjected to the procedure of Example 1 to prepare test specimens.

The results of the measurement by means of the Static Honest Meter were as follows.

| | Half-life of charged voltage (sec.) |
|---|---|
| Untreated | 12 |
| Washed with water | 11 |

EXAMPLES 20, 21 AND 22

40 parts each of graft copolymers obtained substantially as in Example 1 except that the monomer composition was modified as shown in Table 5 and 60 parts each of the thermoplastic resins shown in the same table were kneaded with rolls heated to 170° C. for 3 min. The resulting mixture was molded in the same manner as in Example 1 to prepare test specimens.

The results of the measurement by means of the Static Honest Meter as set forth in Table 5.

TABLE 5

| | Monomer composition (wt.%) | | | | | | | Thermoplastic resin | Half-life of charged voltage (sec.) | |
|---|---|---|---|---|---|---|---|---|---|---|
| | Rubber trunk polymer | | | | Branch polymer | | | | Untreated | Wash with water |
| Example 20 | But 30 | MA 10 | AN 5 | M1 5 | MMA 50 | NDM 1.0 | | DELPET 60N*1 (Asahi Dow) | 8 | 7 |
| Example 21 | But 30 | St 10 | AN 5 | M1 5 | St 37.5 | AN 12.5 | NDM 1.0 | TOYOLAC 900*2 (Toray, K.K.) | 15 | 13 |
| Example 22 | But 30 | St 10 | AN 5 | M1 5 | St 37.5 | AN 12.5 | NDM 1.0 | TYRIL 780*3 (Asahi Dow) | 12 | 10 |

*1 polymethyl methacrylate resin
*2 acrylonitrile-butadiene-styrene resin
*3 acrylonitrile-styrene resin

EXAMPLES 23, 24 AND 25

Graft copolymers obtained substantially as in Example 1 except that the monomer composition was modified as shown in Table 6 and a polyvinyl chloride compound (average degree of polymerization 700; dioctyltin maleate 2 PHR, stearyl alcohol 0.8 PHR and a butyleneglycol montanate 0.2 PHR added; abbreviated to PVC), respectively in the quantities shown in Table 6 were kneaded with rolls heated to 160° C. for 3 min. The resulting mixture was molded in the same manner as in Example 1 to prepare test specimens.

The results of the measurement by means of the Static Honest Meter are summarized in Table 6.

TABLE 6

| | Monomer composition (wt.%) | | | | | | | Quantity of graft copolymer blended (part by wt.) | Quantity of PVC Blended (part by wt.) | Half-life of charged voltage (sec.) | |
|---|---|---|---|---|---|---|---|---|---|---|---|
| | Rubber trunk polymer | | | | Branch polymer | | | | | Untreated | Washed with water |
| Example 23 | But 36 | BA 15 | AN 3 | M1 6 | MMA 40 | NOM* 0.36 | | 17 | 83 | 15 | 13 |
| Example 24 | But 36 | BA 15 | AN 3 | M1 6 | MMA 40 | NOM* 0.36 | | 34 | 66 | <1 | <1 |
| Example 25 | But 48 | BA 20 | AN 4 | M1 8 | MMA 14 | St 6 | NOM 0.18 | 25 | 75 | 1 | 1 |

*Normal octylmercaptan as in all succeeding tables.

EXAMPLES 26 THROUGH 31

Test specimens were prepared as in Example 1 except that the monomer composition was modified as shown in Table 7.

The results of the measurement by means of the Static Honest Meter are set forth below.

TABLE 7

| | Monomer composition (wt.%) | | | | | | | | | Half-life of charged voltage (sec.) | |
|---|---|---|---|---|---|---|---|---|---|---|---|
| | Rubber trunk polymer | | | | Branch polymer | | | | | Untreated | Washed with water |
| Example | But | BA | M1 | MAA | MMA | | NOM | | | | |
| 26 | 12 | 5 | 2 | 1 | 80 | | 0.72 | | | 1 | 1.5 |
| 27 | But | BA | M1 | IA | MMA | | NOM | | | | |
| | 12 | 5 | 2 | 1 | 80 | | 0.72 | | | 2 | 2 |
| 28 | But | BA | M1 | SS | MMA | | NOM | | | | |
| | 12 | 5 | 2 | 1 | 80 | | 0.72 | | | 1 | 1 |
| 29 | But | M1 | AN | | MMA | | NOM | | | | |
| | 12 | 4 | 4 | | 80 | | 0.72 | | | 1 | 2 |
| 30 | But | M1 | | | MMA | | NOM | | | | |
| | 12 | 8 | | | 80 | | 0.72 | | | 2 | 2 |
| 31 | But | BA | MAA | M2 | MMA | BA | St | NDM | | | |
| | 12 | 10.5 | 1.5 | 6 | 59.5 | 7 | 3.5 | 0.42 | | <1 | <1 |

MAA ... methacrylic acid
IA ... itaconic acid
SS ... sodium styrenesulfonate

EXAMPLES 32 THROUGH 35

20 parts each of the graft copolymers shown in Table 8 and 80 parts each of the thermoplastic resins shown in the same table were kneaded with a kneader heated to 220° to 270° C. for 3 min., and the resulting mixture was pressed at 220° to 280° C. under 200 kg/cm² for 3 min. to prepare test specimens.

The results of the measurement by means of the Static Honest Meter are set forth in Table 8.

COMPARISON EXAMPLES 8 THROUGH 11

Test specimens were prepared substantially as in Examples 32 through 35 except that no graft copolymers were added, and the results shown in Table 8 were obtained.

ness through an extruder provided with a T-die, the resin temperature being 205° C. at the outlet of the T-die.

The half-life of the charged voltage of each of these sheets as measured by means of the Static Honest Meter was 1 sec. irrespective of whether the sheet was washed with water.

EXAMPLE 37

The same resin as was used in Example 31 was molded into a product of a size of 100×50×3 mm through an injection molding machine, the resin and mold temperatures being 210° C. and 60° C., respectively.

Test specimens were prepared by cutting the injection-molded product thus obtained to a size of 40×50×3 mm at its central portion.

TABLE 8

| | Monomer composition (wt.%) | | | | | | | Thermoplastic resin | Half-life of charged voltage (sec.) | |
|---|---|---|---|---|---|---|---|---|---|---|
| | Rubber trunk polymer | | | | Branch polymer | | | | Untreated | Washed with water |
| Example | But | BA | M2 | MAA | MMA | MA | NOM | | | |
| 32 | 26 | 23 | 13 | 3 | 21 | 14 | 0.07 | PET-G6763*¹ (Eastman Kodak Co.) | 1 | 1 |
| 33 | But | BA | M2 | MAA | MMA | MA | NOM | Idemitsu polycarbonate A-2700*² (Idemitsu Sekiyu Kagaku K.K.) | 1 | 1 |
| | 26 | 23 | 13 | 3 | 21 | 14 | 0.07 | | | |
| 34 | But | BA | M2 | MAA | MMA | | NOM | DAIAMID L2101*³ (Daicell K.K.) | 0.8 | 1 |
| | 26 | 23 | 13 | 3 | 35 | | 0.28 | | | |
| 35 | But | BA | M2 | MAA | MMA | | NOM | KF polymer #1000*⁴ (Kureha Kagaku Kogyo K.K.) | 3 | 3 |
| | 26 | 23 | 13 | 3 | 35 | | 0.28 | | | |
| Comparison Example 8 | — | | | | — | | | PET-G6763 (Eastman Kodak Co.) | 660 | 680 |
| 9 | — | | | | — | | | Idemitsu polycarbonate A-2700 (Idemitsu Sekiyu Kagaku K.K.) | >3600 | >3600 |
| 10 | — | | | | — | | | DAIAMID L2101 (Daicell K.K.) | 53 | 550 |
| 11 | — | | | | — | | | KF polymer #1000 (Kureha Kagaku Kogyo, K.K.) | 720 | 750 |

*¹polyester copolymer,
*²polycarbonate,
*³nylon 12,
*⁴polyvinylidene fluoride.

EXAMPLE 36

The same resin as was used in Example 26 was molded into T-die extruded sheets of about 100μ thick- The half-life of the charged voltage of each of these test specimens as measured by means of the Static Honest Meter was as follows.

| | |
|---|---|
| Untreated | 1 sec. |
| Washed with water | 1 sec. |

COMPARISON EXAMPLES 12, 13 AND 14

MMA copolymers (A) and MMA copolymers (B) each having the composition set forth below were blended in latex form at the resin weight ratios shown in Table 9, and thoroughly mixed by agitation. The resulting mixtures were subjected to salting out, heat treatment, washing with water and drying in the same manner as in Example 1, whereupon a white powder was obtained in a yield of 99%.

Test specimens were prepared by the procedure of Example 1, and the antistatic property of each of the specimens was similarly evaluated.

The results obtained are shown in Table 9.

TABLE 9

| MMA copolymer (A) | | | |
|---|---|---|---|
| MMA | | 70 | |
| MA | | 10 | |
| M4 | | 20 | |
| NOM | | 0.8 | |
| MMA copolymer (B) | | | |
| MMA | | 80 | |
| MA | | 20 | |
| NOM | | 0.8 | |

| | MMA co-polymer (A) | MMA co-polymer (B) | Half-life of charged voltage (sec.) | |
|---|---|---|---|---|
| | | | Un-treated | Washed with water |
| Comparison | | | | |
| Example 12 | 10 | 90 | 2400 | 2400 |
| Example 13 | 20 | 80 | 780 | 1300 |

TABLE 9-continued

| Example 14 | 50 | 50 | 300 | 720 |
|---|---|---|---|---|

We claim:
1. An antistatic resin composition comprising:
   (A) 10 to 100 parts of a graft copolymer obtained by graft-polymerizing 20 to 95% of at least one grafting monomer selected from the group consisting of alkyl acrylates, alkyl methacrylates, styrene and acrylonitriles, onto 5 to 80% of a rubber trunk polymer which in turn is a copolymer of
   50 to 99% of a member selected from the group consisting of conjugated dienes, alkyl acrylates and mixtures thereof,
   1 to 50% of a polyalkylene oxide monomer selected from the group consisting of those represented by the following general formulae:

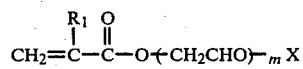

and

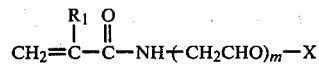

where $R_1$ is H or $CH_3$, X is H or an alkyl group of 1 to 9 carbon atoms and $6 \leq m \leq 50$, and 0 to 49% of a monomer selected from the group consisting of alkyl methacrylates, methacrylic acid, acrylonitriles, styrene, itaconic acid and sodium styrene sulfonate; and
   (B) 0 to 90 parts of a thermoplastic resin compatible with said graft copolymer (A), said rubber trunk polymer being 5 to 80% of the total of the graft copolymer (A) and the thermoplastic resin (B), all quantities expressed in percentages and parts being by weight.
2. An antistatic resin composition as claimed in claim 1, wherein the graft copolymer is obtained by graft-polymerizing 30 to 92% of the grafting monomer onto 8 to 70% of a rubber trunk polymer.

* * * * *